United States Patent
Tsuchiya et al.

(10) Patent No.: US 10,275,666 B2
(45) Date of Patent: Apr. 30, 2019

(54) TRAVEL LANE DETECTION METHOD AND TRAVEL LANE DETECTION DEVICE

(71) Applicant: Nissan Motor Co., Ltd., Yokohama-shi, Kanagawa (JP)

(72) Inventors: Chikao Tsuchiya, Kanagawa (JP); Yasuhito Sano, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 16/087,422

(22) PCT Filed: Mar. 24, 2016

(86) PCT No.: PCT/JP2016/059399
§ 371 (c)(1),
(2) Date: Sep. 21, 2018

(87) PCT Pub. No.: WO2017/163368
PCT Pub. Date: Sep. 28, 2017

(65) Prior Publication Data
US 2019/0102632 A1 Apr. 4, 2019

(51) Int. Cl.
*G06K 9/00* (2006.01)
*B60W 30/18* (2012.01)
(Continued)

(52) U.S. Cl.
CPC ... *G06K 9/00798* (2013.01); *B60W 30/18163* (2013.01); *G06T 7/70* (2017.01); *G08G 1/167* (2013.01); *G06T 2207/30256* (2013.01)

(58) Field of Classification Search
CPC ............. G06K 9/00798; G06K 9/4604; G06K 9/4638; G06T 7/70; G06T 2207/30256; B60W 30/18163; G08G 1/167
See application file for complete search history.

(56) References Cited

U.S. PATENT DOCUMENTS

2002/0105438 A1* 8/2002 Forbes ................ G07C 5/0891
340/901
2007/0050133 A1* 3/2007 Yoshikawa ........ G01C 21/3461
701/437
(Continued)

FOREIGN PATENT DOCUMENTS

JP H09147299 A 6/1997
JP 2002029347 A 1/2002
(Continued)

OTHER PUBLICATIONS

Ma Jiaqi et al. "Real Time Drowsiness Detection Based on Lateral Distance Using Wavelet Transform and Neural Network", pp. 411-418, 2015 IEEE Sysmposium, Series on Computational Intelligence, Dec. 7, 2015.

*Primary Examiner* — Ali Bayat
(74) *Attorney, Agent, or Firm* — Young Basile Hanlon & MacFarlane, P.C.

(57) ABSTRACT

A travel lane detection method detects travel lane boundaries according to a plurality of travel lane characteristic points detected by a target detection sensor installed in a vehicle. When a lane change of the vehicle is detected, the method determines continuity of the travel lane characteristic points detected before the lane change is completed with respect to the travel lane characteristic points detected after the lane change is completed while taking account of a lane change amount so as to detect the travel lane boundaries according to the continuity of the travel lane characteristic points.

8 Claims, 10 Drawing Sheets

(51) Int. Cl.
  *G06T 7/70* (2017.01)
  *G08G 1/16* (2006.01)

(56) References Cited

U.S. PATENT DOCUMENTS

| | | | |
|---|---|---|---|
| 2007/0084655 A1 | 4/2007 | Kakinami et al. | |
| 2011/0164790 A1* | 7/2011 | Sakurai | G06K 9/00798 382/104 |
| 2011/0205362 A1* | 8/2011 | Suzuki | G06K 9/00798 348/148 |
| 2012/0027255 A1* | 2/2012 | Endo | G06K 9/00798 382/103 |
| 2015/0294164 A1* | 10/2015 | Sakamoto | G06K 9/00798 382/104 |
| 2017/0089717 A1* | 3/2017 | White | G01C 21/3658 |

FOREIGN PATENT DOCUMENTS

| | | | |
|---|---|---|---|
| JP | 2003203298 A | 7/2003 | |
| JP | 2005100000 A | 4/2005 | |
| JP | 2007241468 A | 9/2007 | |
| JP | 2010102427 A | 5/2010 | |
| JP | 2014076689 A | 5/2014 | |

\* cited by examiner (a)

(b)

(a)

(b)

(a)

(b)

TRAVEL LANE DETECTION METHOD AND TRAVEL LANE DETECTION DEVICE

TECHNICAL FIELD

The present invention relates to a travel lane detection method and a travel lane detection device.

BACKGROUND

A device is known to detect a travel lane from an image of a road surface (Japanese Patent Unexamined Publication No. 2005-100000). The device disclosed in Japanese Unexamined Publication No. 2005-100000 generates a horizontal edge histogram for a plurality of edge points projected in reverse on coordinates of the road surface. The device then obtains peak positions in the edge histogram and makes the edge points contributing to the respective peak positions into a group, so as to detect lane markers.

When the vehicle changes lanes, the positions of the lane markers with respect to the vehicle are shifted from the positions before the lane change by the amount of lateral movement of the vehicle after the lane change. As a result, an edge group belonging to the common lane markers cannot be extracted correctly.

SUMMARY

In view of the above problem, the present invention provides a travel lane detection method and a travel lane detection device capable of detecting a travel lane without being influenced by a change in distance between a vehicle and travel lane characteristic points derived from a lane change.

An aspect of the present invention is a travel lane detection method for detecting travel lane boundaries according to a plurality of travel lane characteristic points detected by a target detection sensor installed in a vehicle, wherein when a lane change of the vehicle is detected, the method correct the travel lane characteristic points detected and accumulated before the lane change starts according to an amount of movement of the vehicle in a vehicle width direction derived from the lane change, and detect the travel lane boundaries after the lane change of the vehicle is completed by use of the corrected travel lane characteristic points detected and accumulated before the lane change starts and the travel lane characteristic points detected and accumulated after the lane change is completed.

The method according to the aspect of the present invention can detect the travel lane without being influenced by a change in distance between the vehicle and the travel lane characteristic points derived from the lane change.

DETAILED DESCRIPTION

First Embodiment

An embodiment will be described in detail below with reference to the drawings.

Figure 1:
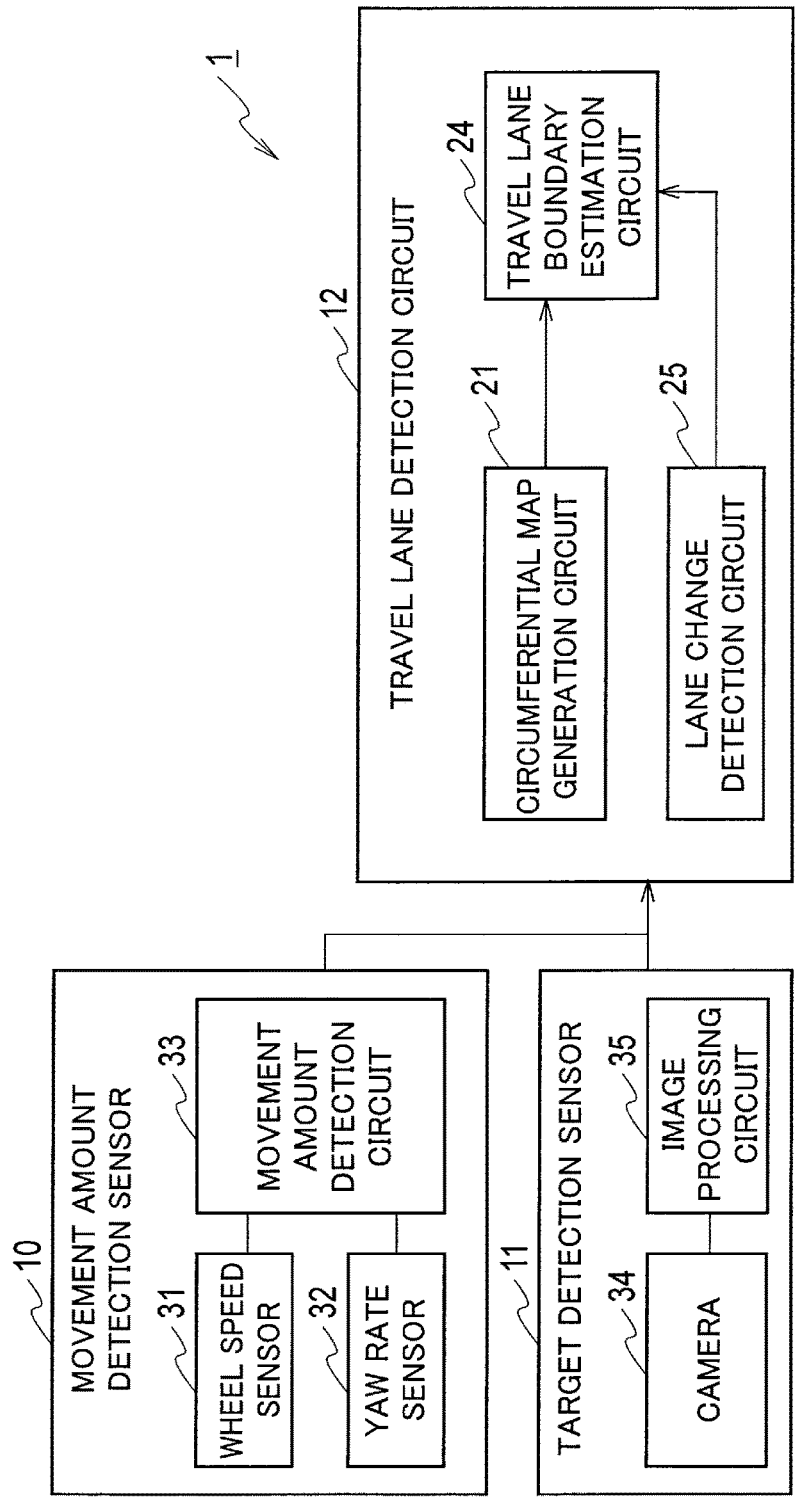
FIG. 1 is a block diagram showing a configuration of a travel lane detection device 1 according to a first embodiment.

An entire configuration of a travel lane detection device 1 according to a first embodiment is described with reference to FIG. 1. The travel lane detection device 1 detects boundaries of a travel lane in which a vehicle is traveling according to travel lane characteristic points on a road surface detected by a sensor mounted on the vehicle. The travel lane detection device 1 includes a target detection sensor 11 mounted on the vehicle, a movement amount detection sensor 10 for detecting the amount of movement of the vehicle based on a moving velocity and a yaw rate of the vehicle, and a travel lane detection circuit 12 for detecting the boundaries of the travel lane based on the travel lane characteristic points detected by the target detection sensor 11 and the amount of movement of the vehicle detected by the movement amount detection sensor 10.

The target detection sensor 11 detects white lines (including lane markers) marked on the road surface around the vehicle. The target detection sensor 11 includes a camera 34 installed in the vehicle, and an image processing circuit 35 for detecting road surface marks including the white lines from a digital image captured by the camera 34. The detected road surface marks are indicated as characteristic point groups each including a plurality of travel lane characteristic points and showing the positions of the road surface marks. The image processing circuit 35 is only required to detect points (luminance edges) of which brightness on the image varies quickly or intermittently as the travel lane characteristic points. The camera 34 is fixed to the vehicle with the capturing side directed forward of the vehicle, and includes a wide-angle lens capable of capturing images in a wide angle of view. The camera 34 thus can detect the white lines (the lane markers) which the vehicle is moving across during the lane change.

The movement amount detection sensor 10 includes a wheel speed sensor 31, a yaw rate sensor 32, and a movement amount detection circuit 33. The wheel speed sensor 31 detects a rotational speed of the wheels of the vehicle. The yaw rate sensor 32 detects a yaw rate of the vehicle. The movement amount detection circuit 33 detects the amount of movement of the vehicle for a predetermined period of time according to the rotational speed of the wheels and the yaw rate of the vehicle. The amount of movement of the vehicle includes a moving direction and a moving distance of the vehicle, for example.

The travel lane detection circuit 12 may be a microcomputer including a central processing unit (CPU), a memory, and an input/output unit. A computer program (a travel lane detection program) for causing the microcomputer to serve as the travel lane detection circuit 12 is installed to be executed in the microcomputer. Accordingly, the microcomputer functions as the travel lane detection circuit 12. While the present embodiment is illustrated with the case in which the software is installed to fabricate the travel lane detection circuit 12, it should be understood that dedicated hardware for executing each information processing as described below can be prepared to compose the travel lane detection circuit 12. A plurality of circuits (21, 24, 25) included in the travel lane detection circuit 12 may each be composed of individual hardware. In addition to the travel lane detection circuit 12, the image processing circuit 35 and the movement amount detection circuit 33 may each be composed of software or dedicated hardware. The travel lane detection circuit 12 may also serve as an electronic control unit (ECU) used for other control processing in the vehicle.

The travel lane detection circuit 12 includes a circumferential map generation circuit 21, a lane change detection circuit 25, and a travel lane boundary estimation circuit 24. The circumferential map generation circuit 21 accumulates the travel lane characteristic points detected by the target detection sensor 11 mounted on the vehicle in accordance with the amount of movement of the vehicle. In particular, the circumferential map generation circuit 21 generates a map around the circumference of the vehicle (a first circumferential map) composed of characteristic point groups obtained such that detection histories of the characteristic point groups detected by the target detection sensor 11 are connected together according to the amount of movement of the vehicle for a period during which each characteristic point group is detected. Namely, the circumferential map generation circuit 21 connects the respective travel lane characteristic points together measured at different times while taking account of the amount of movement of the vehicle. The circumferential map generation circuit 21 thus accumulates the detection histories of the travel lane characteristic points to generate the first circumferential map.

More particularly, the camera 34 captures an image of a road surface around the circumference of the vehicle per predetermined time. The movement amount detection sensor 10 detects the moving direction and the moving distance of the vehicle for the predetermined time. The circumferential map generation circuit 21 moves the positions of the travel lane characteristic points by the moving distance of the vehicle in the direction opposite to the moving direction of the vehicle. The circumferential map generation circuit 21 repeats this operation and connects the plural travel lane characteristic points together measured at different times while taking account of the amount of movement of the vehicle, so as to accumulate the detection histories of the travel lane characteristic points to generate the first circumferential map.

The lane change detection circuit 25 detects a lane change according to the image of the road surface in front of the vehicle captured by the camera 34. In particular, the lane change detection circuit 25 can determine whether the vehicle moves across the lane markers according to the positions of the lane markers on the image, since the capturing side of the camera 34 is fixed with respect to the vehicle. When the vehicle is determined to move across the lane markers, the lane change detection circuit 25 detects the lane change. The lane change detection circuit 25 may detect the lane change at the point when the vehicle is actually moving across the lane markers or at the point when the vehicle is presumed to move across the lane markers. The lane change detection circuit 25 may determine the lane change based on information other than of the image captured by the camera 34. For example, the lane change detection circuit 25 may determine the lane change according to a combination of a position of the vehicle on a map and an operating condition of a direction indicator, or a combination of a steering angle or a turning angle and the operating condition of the direction indicator. As described below, the lane change detection circuit 25 may determine the lane change according to continuity of travel lane characteristic points on a second circumferential map.

Figure 3A:
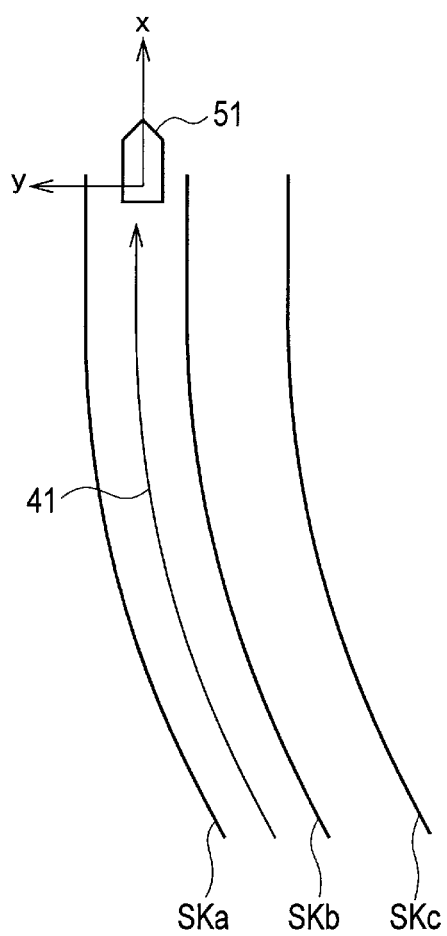
FIG. 3A is a bird's-eye view showing a state in which a vehicle 51 is traveling on the left side of a two-lane road slightly curving to the right.

As shown in FIG. 3A, a vehicle 51 is traveling on the left side of a two-lane road slightly curving to the right. FIG. 3A illustrates three travel lane boundaries (SKa, SKb, and SKc) defining the two-lane road. The first circumferential map generated by the circumferential map generation circuit 21 includes characteristic point groups (not shown) detected along the three travel lane boundaries (SKa, SKb, and SKc). The present embodiment uses plane coordinates in which the traveling direction of the vehicle 51 is defined as an x-axis, and the width direction of the vehicle 51 is defined as a y-axis, on the basis of the position of the vehicle 51 which is the origin of the two axes.

The travel lane boundary estimation circuit 24 detects the accumulated travel lane characteristic points, namely, the travel lane boundaries based on the first circumferential map. In particular, the travel lane boundary estimation circuit 24 first determines continuity of the travel lane characteristic points included in the first circumferential map. The travel lane boundary estimation circuit 24 then detects the travel lane boundaries based on the continuity of the travel lane characteristic points. The following are details of the processing operation of the travel lane boundary estimation circuit 24.

The travel lane boundary estimation circuit 24 determines the continuity of the plural travel lane characteristic points according to a frequency on the coordinate in the vehicle width direction (the y-axis direction). For example, the travel lane boundary estimation circuit 24 generates a second circumferential map in which the position of the vehicle 51 is the origin, the width direction of the vehicle 51 is the y-axis, and the axis orthogonal to the y-axis is a time axis (a t-axis), without taking account of the amount of movement of the vehicle 51. The travel lane boundary estimation circuit 24 plots, on the second circumferential map, a plurality of travel lane characteristic points FP included in the first circumferential map shown in FIG. 3A, in accordance with the detection time (t) and the positions (the y-coordinates) in the vehicle width direction, as shown in FIG. 3B(a).

Figure 3B:
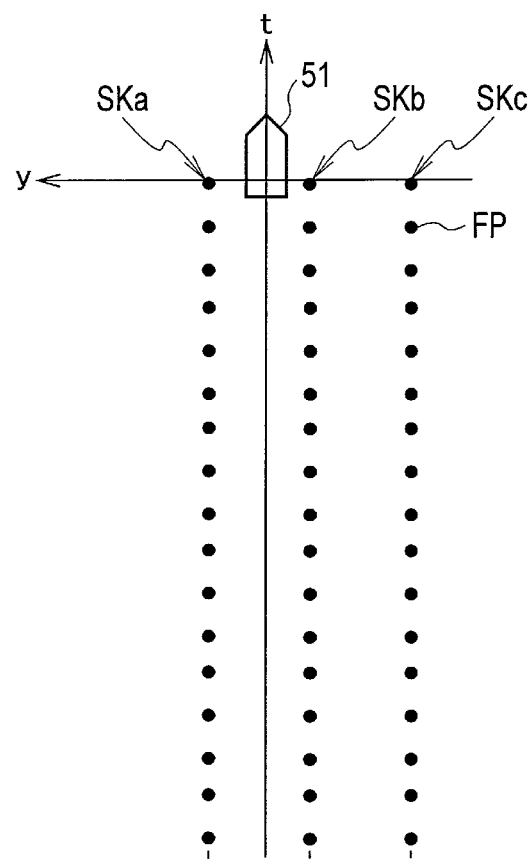
FIG. 3B(a) is a bird's-eye view illustrating a second circumferential map generated from a first circumferential map shown in FIG. 3A, and FIG. 3B(b) is a graph illustrating a histogram generated from the second circumferential map in FIG. 3B(a)
Figure 3B:
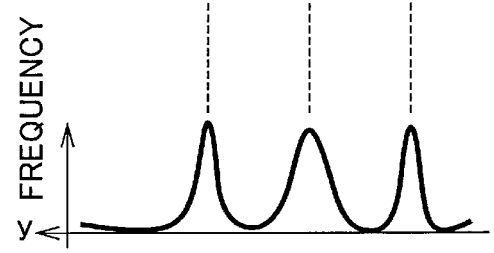

When the vehicle 51 is traveling along the travel lanes as shown in FIG. 3A, the positions (the y-coordinates) of the travel lane characteristic points FP in the vehicle width direction are constant, as shown in the second circumferential map in FIG. 3B(a), since the amount of movement of the vehicle 51 is not taken into account with respect to the time axis (the t-axis). Therefore, the travel lane characteristic points FP are plotted along the straight lines parallel to the t-axis, regardless of the road shape (a slight right-hand curve).

The travel lane boundary estimation circuit 24 votes the travel lane characteristic points FP shown in the second circumferential map to the one-dimensional histogram along the y-axis, as shown in FIG. 3B(b). The travel lane boundary estimation circuit 24 can determine the continuity of the travel lane characteristic points FP from the histogram.

The travel lane boundary estimation circuit 24 detects peaks in the histogram (the y-coordinates) and groups the travel lane characteristic points FP on the second circumferential map per peak, so as to extract travel lane boundary point groups. For example, the travel lane boundary estimation circuit 24 can group the travel lane characteristic points FP voted to the histogram by causing the respective travel lane characteristic points FP to belong to the closest peak. The grouping of the travel lane characteristic points FP on the second circumferential map is easier than the grouping of the travel lane characteristic points FP on the first circumferential map. Each of the grouped travel lane characteristic points FP composes a single travel lane boundary point group. The travel lane boundary estimation circuit 24 thus can determine the continuity of the travel lane characteristic points FP based on the frequency on the coordinate in the vehicle width direction (the y-coordinate) of the travel lane characteristic points FP. The grouping by use of the histogram allows the travel lane boundary estimation circuit 24 to extract a plurality of travel lane boundary point groups parallel to each other simultaneously. Instead of the use of the histogram, the travel lane boundary estimation circuit 24 may cause curves to approximate to the travel lane characteristic points FP, by use of a known method so as to fit a plurality of curves to the boundary point groups. The travel lane boundary estimation circuit 24 may then determine whether the fitted curves are parallel to each other.

Subsequently, the travel lane boundary estimation circuit 24 estimates outlines of the travel lane boundaries (SKa, SKb, and SKc) based on the travel lane boundary point groups extracted. In particular, the travel lane boundary estimation circuit 24 fits a curve expressed by a road model function to the respective travel lane boundary point groups on the first circumferential map, so as to estimate the outlines of the travel lane boundaries (SKa, SKb, and SKc). The road model function is a cubic function ($y=ax^3+bx^2+cx+d$), for example. The travel lane boundary estimation circuit 24 calculates the coefficients a, b, c, and d of the cubic function. Although function fitting by least squares may be applied to the calculation, robust estimation such as random sample consensus (RANSAC) may be used in order to improve stability.

As described above, when the vehicle 51 is traveling along the travel lanes as shown in FIG. 3A, the travel lane boundary point groups can easily be extracted by use of the peaks (the y-coordinates) in the histogram, regardless of the outlines of the road.

Figure 4A:
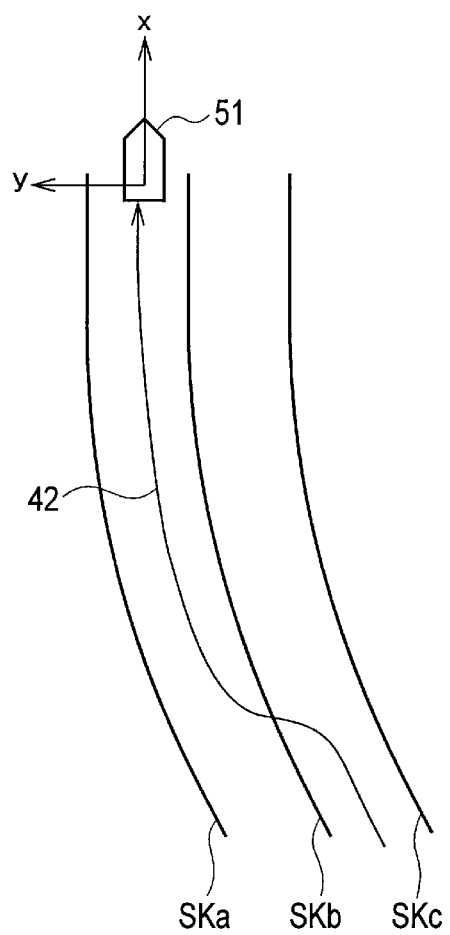
FIG. 4A is a bird's-eye view showing a state of changing lanes in which the vehicle 51 traveling on the right side of the two-lane road slightly curving to the right is changing to the left lane.

In contrast, the travel lane boundary point groups may be hard to accurately extract by the method described with reference to FIG. 3A and FIG. 3B when the vehicle 51 changes lanes as illustrated in FIG. 4A.

FIG. 4A is a bird's-eye view showing a state of changing lanes in which the vehicle 51 traveling on the right side of the two-lane road slightly curving to the right is changing to the left lane. In this case, the first circumferential map generated by the circumferential map generation circuit 21 includes the characteristic point groups (not shown) detected along the three travel lane boundaries (SKa, SKb, and SKc), as in the case shown in FIG. 3A. However, the lateral positions (the y-coordinates) of the travel lane boundaries (SKa, SKb, and SKc) with respect to the vehicle 51 are changed during the period of the lane change, which differs from the case shown in FIG. 3A.

Figure 4B:
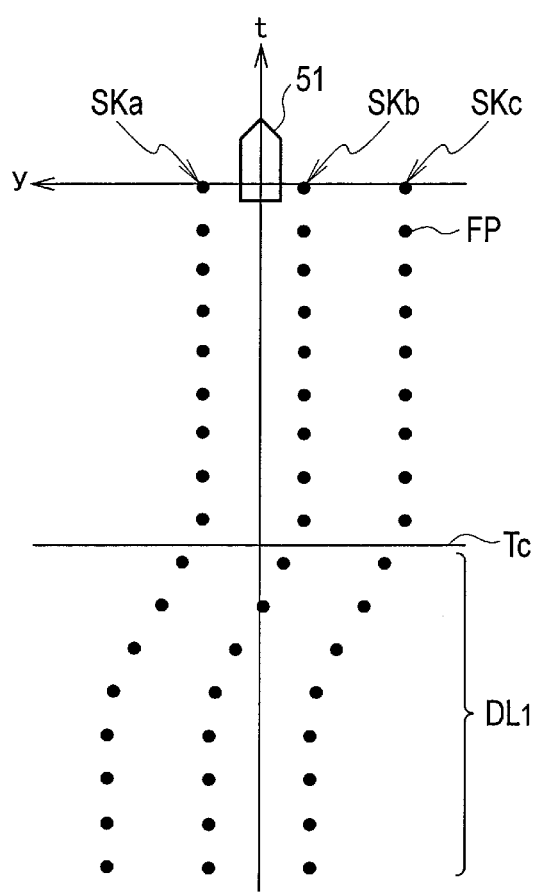
FIG. 4B is a bird's-eye view illustrating a second circumferential map generated from a first circumferential map shown in FIG. 4A.

Therefore, a second circumferential map shown in FIG. 4B differs from that shown in FIG. 3B. In particular, the y-coordinates of the travel lane characteristic points FP vary during the period from the start of the lane change to the completion of the lane change (during the period of changing lanes), since the amount of movement of the vehicle 51 is not taken into account in the second circumferential map. The y-coordinates of the travel lane characteristic points FP detected before the start of the lane change are thus shifted from the y-coordinates of the travel lane characteristic points FP detected after the completion of the lane change. As a result, the peaks on the y-axis in the one-dimensional histogram to which the travel lane characteristic points FP shown in the second circumferential map shown in FIG. 4B are voted, do not conform to the peaks as shown in FIG. 3B(b). It is thus difficult to accurately extract the travel lane characteristic point groups in accordance with the peaks.

Figure 4C:
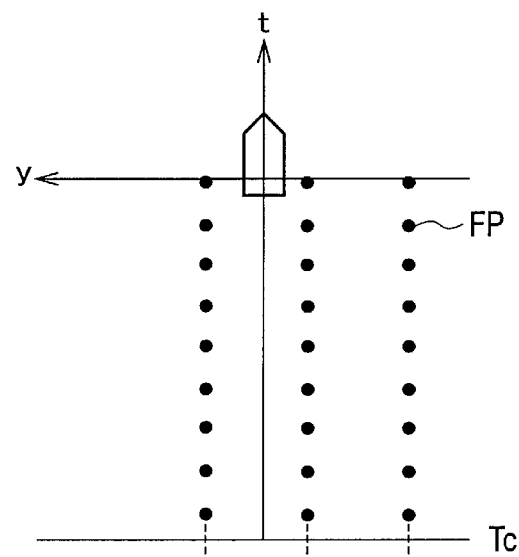
FIG. 4C(a) is a view showing a third map from which travel lane characteristic points FP detected before a lane change completion time (Tc) are eliminated from the second circumferential map shown in FIG. 4B, and FIG. 4C(b) is a graph illustrating a histogram generated from the third map.
Figure 4C:
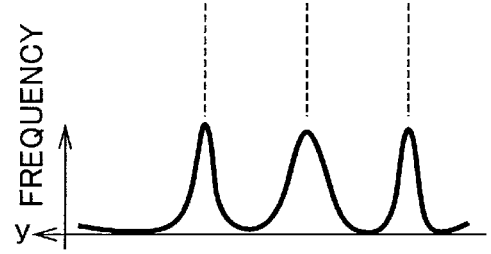

The travel lane boundary estimation circuit 24 thus estimates the travel lane boundaries in accordance with the continuity of the travel lane characteristic points detected after the completion of the lane change. In particular, as shown in FIG. 4C(a), a third circumferential map is generated in which the travel lane characteristic points FP detected before a time (Tc) when the lane change is completed are eliminated from the second circumferential map shown in FIG. 4B. The travel lane boundary estimation circuit 24 then extracts the travel lane characteristic point groups by use of the peaks (the y-coordinates) in the histogram generated from the third circumferential map, as shown in FIG. 4C(b). Since the y-coordinates of the travel lane characteristic points FP detected after the completion of the lane change are substantially constant, the travel lane characteristic point groups can easily be extracted by use of the peaks (the y-coordinates) in the histogram in the same manner as illustrated in FIG. 3B.

Thereafter, as described above, the travel lane boundary estimation circuit 24 fits a curve represented by a road model function to the respective travel lane boundary point groups on the first circumferential map, so as to estimate the outlines of the travel lane boundaries (SKa, SKb, and SKc).

The travel lane boundary estimation circuit 24 sets the time (Tc) when the lane change is completed based on the time when the lane change detection circuit 25 detects the lane change. For example, the length of the period during which the vehicle is changing lanes may be preliminarily set to five seconds, and the time when a predetermined time (2.5 seconds) has passed since the lane change detection circuit 25 detects the lane change may be determined as the time (Tc) when the lane change is completed. The period during which the vehicle is changing lanes and the predetermined time may be regulated depending on a lane width included in map information or a speed of the vehicle.

Figure 2:
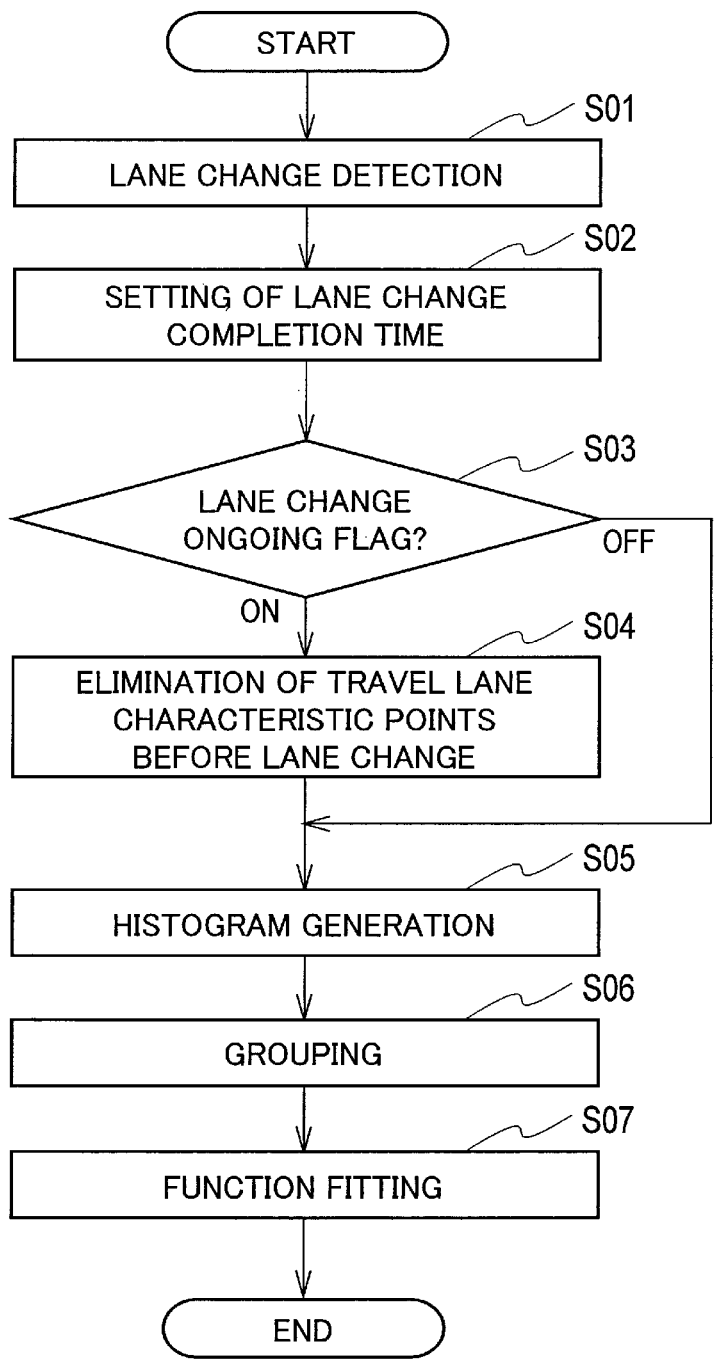
FIG. 2 is a flow chart illustrating a travel lane detection method using the travel lane detection device 1 shown in FIG. 1.

Next, an example of a travel lane detection method using the travel lane detection device 1 shown in FIG. 1, when the vehicle 51 changes lanes, is described below with reference to a flow chart shown in FIG. 2. The following is an operating process performed by the travel lane detection circuit 12 included in the travel lane detection device 1. The processing shown in FIG. 2 is executed repeatedly in a predetermined cycle.

In step S01, the lane change detection circuit 25 detects a lane change from an image of a road surface in front of the vehicle captured by the camera 34. The lane change detection circuit 25 then sets a lane change ongoing flag. In particular, the lane change detection circuit 25 detects the lane change according to the y-coordinates of the travel lane characteristic points FP. The lane change may be detected when the signs (+/−) on the y-coordinates of the travel lane characteristic points FP are reversed. The process proceeds to step S02, and the travel lane boundary estimation circuit 24 sets a point at which the lane change is completed in accordance with the speed of the vehicle at a point when the lane change is detected. In particular, the travel lane boundary estimation circuit 24 sets the time (Tc) when the lane change is completed based on the time when the lane change detection circuit 25 detects the lane change. For example, the time when 2.5 seconds have passed since the lane change detection circuit 25 detects the lane change is determined as the time (Tc) when the lane change is completed. The time (Tc) when the lane change is completed is not necessarily strictly estimated. The length of the period during which the vehicle is changing lanes may be set to a sufficiently long period of time. It is only required to reduce the influence on the outline estimation for travel lane boundaries on the first circumferential map, and the time (Tc) when the lane change is completed may be estimated with sufficient accuracy by a simple method.

The process proceeds to step S03, and the travel lane boundary estimation circuit 24 determines whether the lane change ongoing flag is set. When the lane change ongoing flag is set (YES in step S03), the travel lane boundary estimation circuit 24 determines that the vehicle is changing lanes, namely, the lane change has started but not completed yet, and the process proceeds to step S04. When the lane change ongoing flag is not set yet (NO in step S03), the travel lane boundary estimation circuit 24 determines that the vehicle is not changing lanes, and the process proceeds to step S05.

Since the y-coordinates of the travel lane characteristic points FP during the lane change vary, the y-coordinates of the travel lane characteristic points FP detected before the start of the lane change are shifted from the y-coordinates of the travel lane characteristic points FP detected after the completion of the lane change. Thus, in step S04, the travel lane boundary estimation circuit 24 generates the third circumferential map (FIG. 4C(a)) eliminating the travel lane characteristic points FP detected before the time (Tc) when the lane change is completed from the second circumferential map shown in FIG. 4B. When the current time exceeds the lane change completion time (Tc), the lane change ongoing flag is cleared. The process then proceeds to step S05.

In step S05, the travel lane boundary estimation circuit 24 votes the travel lane characteristic points FP, shown in the third circumferential map, to the one-dimensional histogram along the y-axis as shown in FIG. 4C(b). When the flag is not set, the histogram is generated by use of the second circumferential map.

The process proceeds to step S06, and the travel lane boundary estimation circuit 24 determines the continuity of the travel lane characteristic points from the histogram. In particular, the travel lane boundary estimation circuit 24 detects peaks (y-coordinates) in the histogram and groups the travel lane characteristic points FP on the third circumferential map per peak, so as to extract travel lane boundary point groups.

The process proceeds to step S07, and the travel lane boundary estimation circuit 24 fits a curve expressed by a road model function to the respective travel lane boundary point groups extracted on the first circumferential map, so as to estimate the respective travel lane boundaries (SKa, SKb, and SKc).

As described above, the first embodiment can achieve the following effects.

When the lane change of the vehicle 51 is detected, the travel lane boundary estimation circuit 24 determines the continuity of the travel lane characteristic points FP detected before the completion of the lane change, with respect to the travel lane characteristic points FP detected after the completion of the lane change, while taking account of the lane change amount (the offset amount), so as to detect the travel lane boundaries based on the continuity of travel lane characteristic points FP. The continuity of the travel lane characteristic points FP before and after the lane change is taken into consideration according to the amount of movement (the lane change amount) in the vehicle width direction derived from the lane change. According to the first embodiment, the continuity of the travel lane characteristic points FP is determined while taking account of the process of "taking no account of the travel lane characteristic points FP detected before the lane change is completed". Accordingly, the travel lane can be detected without being influenced by a change in distance between the vehicle 51 and the travel lane characteristic points FP derived from the lane change.

The travel lane boundary estimation circuit 24 estimates the travel lane boundaries in accordance with the continuity of the travel lane characteristic points FP detected after the completion of the lane change. Accordingly, the travel lane boundaries can be estimated while eliminating the influence of a change of the lateral positions (the y-coordinates) of the travel lane characteristic points FP before the completion of the lane change, in a case in which the amount of movement (the lane change amount) of the vehicle in the vehicle width direction derived from the lane change cannot be estimated accurately.

The travel lane boundary estimation circuit 24 determines the continuity of the travel lane characteristic points in accordance with the frequency of the positions of the travel lane characteristic points in the vehicle width direction. The travel lane boundary estimation circuit 24 expresses the travel lane characteristic points on the circumferential map as a one-dimensional histogram accumulated on the y-axis in the vehicle width direction. The lane boundaries thus can be detected from the peaks on the histogram, so as to easily estimate a lane outline per lane boundary.

The travel lane boundary estimation circuit 24 sets the period from which the lane change starts to which the lane change is completed in accordance with the time when the lane change of the vehicle 51 is detected. According to the first embodiment, the time when the lane change is completed is set in accordance with the time when the lane change of the vehicle 51 is detected. Accordingly, the travel lane characteristic points FP, detected after the lane change is completed, can be specified accurately.

Second Embodiment

The travel lane boundary estimation circuit 24 according to a second embodiment corrects, with the lane change amount, the positions (the y-coordinates) of the travel lane characteristic points FP in the vehicle width direction detected before the lane change starts. The travel lane boundary estimation circuit 24 then estimates the travel lane boundaries based on the continuity of the travel lane characteristic points after the correction. In particular, the travel lane boundary estimation circuit 24 detects the travel lane boundaries by combining travel lane characteristic points FP' after the correction and travel lane characteristic points FP detected after the lane change is completed. The travel lane boundary estimation circuit 24 eliminates the travel lane characteristic points FP detected between the start and the completion of the lane change, in a manner similar to the first embodiment. The block configuration of the travel lane detection device 1 is the same as shown in FIG. 1, and an illustration and explanations thereof are not made herein.

Figure 6A:
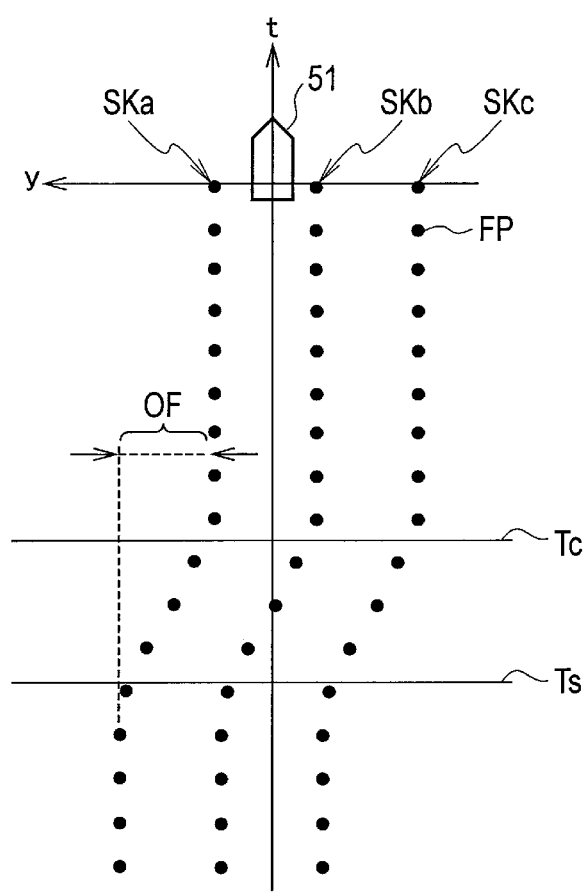
FIG. 6A is a bird's-eye view illustrating a second circumferential map generated from the first circumferential map shown in FIG. 4A.
Figure 6B:
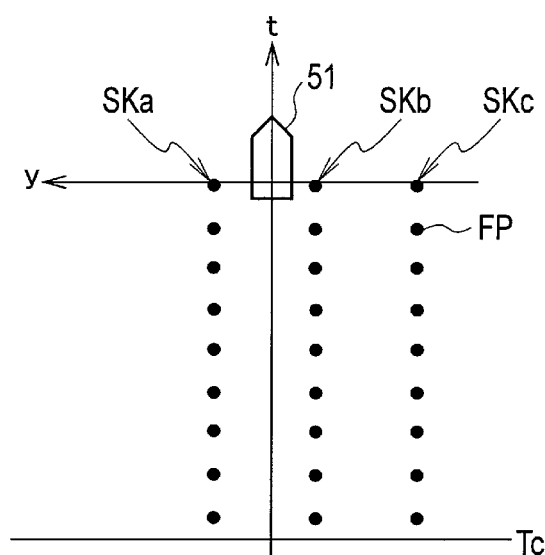
FIG. 6B(a) is a view showing a third map in which the lane change amount (OF) of the travel lane characteristic points FP included in y-coordinates detected before the lane change starts is offset from the second circumferential map shown in FIG. 6A, and FIG. 6B(b) is a graph illustrating a histogram generated from the third map.
Figure 6B:
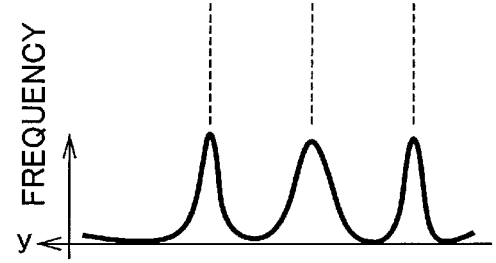

FIG. 6A is a view showing a second circumferential map generated from the first circumferential map shown in FIG. 4A, as in the case of FIG. 4B. The travel lane boundary estimation circuit 24 generates the second circumferential map shown in FIG. 6A from the first circumferential map when the vehicle 51 changes lanes. As shown in FIG. 6B(a), the y-coordinates of the travel lane characteristic points FP detected before the time (Ts) when the lane change starts are shifted in the direction opposite to the lane change direction by the same amount as the lane change amount (OF). Accordingly, the lane change amount (OF) included in the y-coordinates of the travel lane characteristic points FP detected before the time (Ts) when the lane change starts can be offset.

Further, the travel lane characteristic points FP detected from the time (Ts) when the lane change starts to the time (Tc) when the lane change is completed are eliminated from the second circumferential map shown in FIG. 6A. The travel lane boundary estimation circuit 24 thus generates a fourth circumferential map as shown in FIG. 6B(a) from the second circumferential map shown in FIG. 6A.

The offset amount (the lane change amount) corresponds to a lane width of a single lane, and may be preliminarily set according to an average lane width. The travel lane boundary estimation circuit 24 performs the offsetting processing so as to group the travel lane characteristic points. Therefore, a slight error between the actual lane width and the offset amount (the lane change amount) is allowed. The offset amount (the lane change amount) is thus preliminarily determined.

As shown in FIG. 6B(b), the travel lane boundary estimation circuit 24 extracts travel lane boundary point groups by use of peaks (y-coordinates) in a histogram generated from the fourth circumferential map. As shown in FIG. 6B(a), the y-coordinates of the travel lane characteristic points FP' after the correction substantially corresponds to the y-coordinates of the travel lane characteristic points FP detected after the lane change is completed. Thus, the travel lane boundary point groups can easily be extracted by use of the peaks (the y-coordinates) in the histogram, as in the case shown in FIG. 3B.

Thereafter, as described above, the travel lane boundary estimation circuit 24 fits a curve expressed by a road model function to the respective travel lane boundary point groups, so as to estimate the respective travel lane boundaries (SKa, SKb, and SKc).

The travel lane boundary estimation circuit 24 sets the time (Ts) when the lane change starts based on the time when the lane change detection circuit 25 detects the lane change. For example, the length of the period during which the vehicle is changing lanes may be preliminarily set to five seconds, and the time which is set a predetermined time (2.5 seconds) ahead of the detection of the lane change by the lane change detection circuit 25 may be determined as the time (Ts) when the lane change starts. The period during which the vehicle is changing lanes and the predetermined time may be regulated depending on a lane width included in map information or a speed of the vehicle.

Next, another example of the travel lane detection method using the travel lane detection device 1 when the vehicle 51 changes lanes is described below with reference to a flow chart shown in FIG. 5. The following is an operating process performed by the travel lane detection circuit 12 included in the travel lane detection device 1. The processing shown in FIG. 5 is executed repeatedly in a predetermined cycle.

Figure 5:
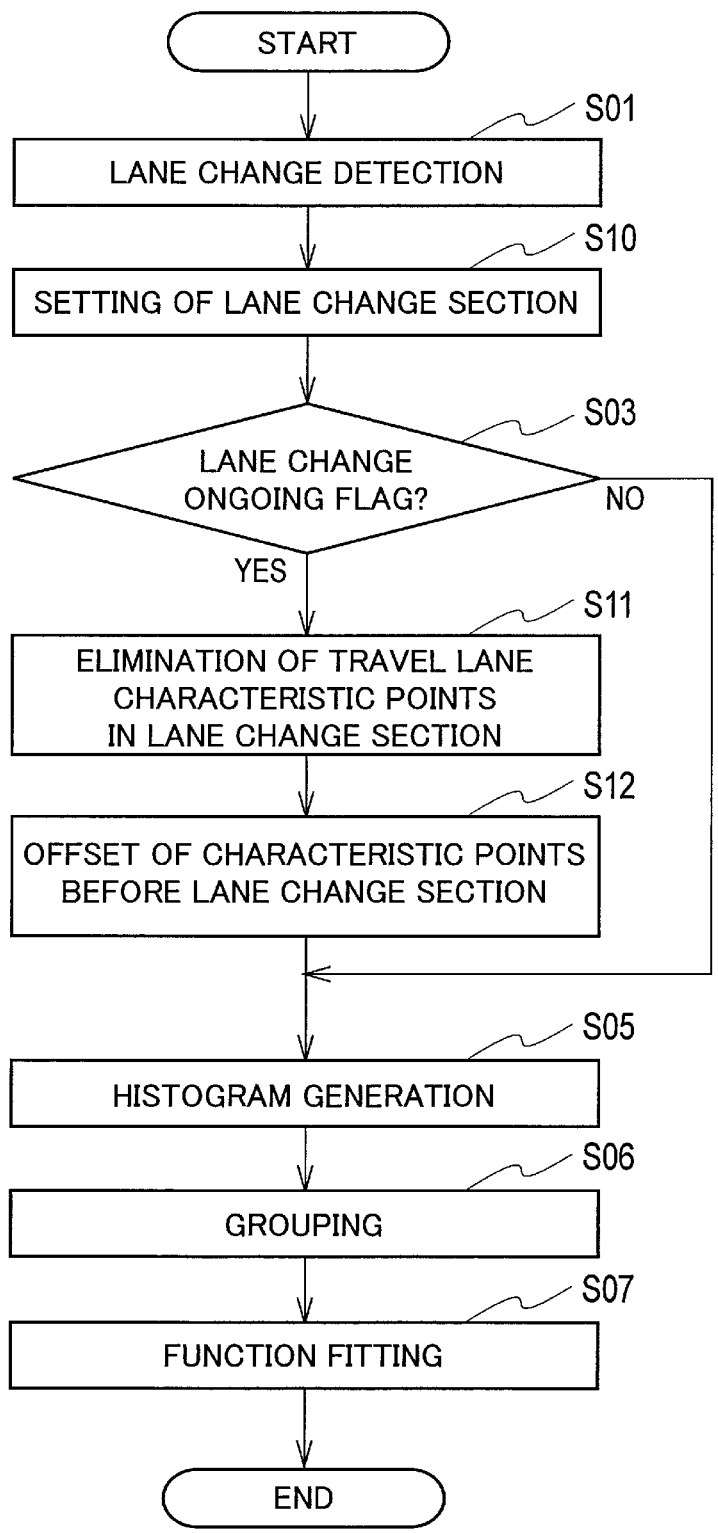
FIG. 5 is a flow chart illustrating a travel lane detection method using the travel lane detection device 1 according to a second embodiment.

In the flow chart shown in FIG. 5, step S10 is executed instead of step S02 in FIG. 2, and steps S11 and S12 are executed instead of step S04 in FIG. 2. The other steps S01, S03, and S05 to S07 are the same as in FIG. 2, and explanations thereof are not repeated below.

In step S10, the travel lane boundary estimation circuit 24 sets a point at which the lane change starts and a point at which the lane change is completed according to the speed of the vehicle when the lane change is detected. In particular, the travel lane boundary estimation circuit 24 sets the time (Ts) when the lane change starts and the time (Tc) when the lane change is completed, based on the time when the lane change detection circuit 25 detects the lane change. For example, the travel lane boundary estimation circuit 24 sets the time 2.5 seconds ahead of the detection of the lane change by the lane change detection circuit 25 as the time (Ts) when the lane change starts. The travel lane boundary estimation circuit 24 sets the time when 2.5 seconds have passed since the lane change detection circuit 25 detects the lane change as the time (Tc) when the lane change is completed. The time (Ts) when the lane change starts is not necessarily strictly estimated. The length of the period during which the vehicle is changing lanes may be set to a sufficiently long period of time. It is only required to reduce the influence on the outline estimation for travel lane boundaries on the first circumferential map, and the lane change start time (Ts) may be estimated with sufficient accuracy by a simple method.

When the lane change ongoing flag is set (YES in step S03), the process proceeds to step S11. Since the y-coordinates of the travel lane characteristic points FP during the lane change vary, the y-coordinates of the travel lane characteristic points FP detected before the start of the lane change are shifted from the y-coordinates of the travel lane characteristic points FP detected after the completion of the lane change.

Thus, in step S11, the travel lane boundary estimation circuit 24 eliminates the travel lane characteristic points FP detected between the time (Ts) when the lane change starts and the time (Tc) when the lane change is completed from the second circumferential map shown in FIG. 6A. When the current time exceeds the lane change completion time (Tc), the lane change ongoing flag is cleared.

The process proceeds to step S12, and the travel lane boundary estimation circuit 24 shifts the y-coordinates of the travel lane characteristic points FP detected before the time (Ts) when the lane change starts in the opposite direction by the same amount as the lane change amount (OF), as shown in FIG. 6B(a). Accordingly, the lane change amount (OF) included in the y-coordinates of the travel lane characteristic points FP detected before the time (Ts) when the lane change starts can be offset.

The process proceeds to step S05, and the travel lane boundary estimation circuit 24 votes the travel lane characteristic points FP' after the correction shown in FIG. 6B(a) and the travel lane characteristic points FP detected after the time (Tc) when the lane change is completed to the one-dimensional histogram along the y-axis, as shown in FIG. 6B(b).

The process proceeds to step S06, and the travel lane boundary estimation circuit 24 detects peaks (y-coordinates) in the histogram shown in FIG. 6B(b) and groups the travel lane characteristic points (FP, FP') on the fourth circumferential map per peak, so as to extract travel lane boundary point groups. The process proceeds to step S07, and the travel lane boundary estimation circuit 24 fits a curve expressed by a road model function to the respective travel lane boundary point groups extracted on the first circumferential map, so as to estimate the respective travel lane boundaries (SKa, SKb, and SKc).

As described above, the second embodiment can achieve the following effects.

When the lane change of the vehicle 51 is detected, the travel lane boundary estimation circuit 24 determines the continuity of the travel lane characteristic points FP detected before the completion of the lane change, with respect to the travel lane characteristic points FP detected after the completion of the lane change, while taking account of the lane change amount (the offset amount), so as to detect the travel lane boundaries based on the continuity of travel lane characteristic points FP. The continuity of the travel lane characteristic points FP before and after the lane change is taken into consideration according to the amount of movement (the lane change amount) in the vehicle width direction derived from the lane change. According to the second embodiment, the continuity of the travel lane characteristic points FP is determined while taking account of the process of "taking no account of the travel lane characteristic points FP detected between the start and the completion of the lane change, and shifting the positions of the travel lane characteristic points FP detected before the start of the lane change in view of the offset amount". Accordingly, the travel lane can be detected without being influenced by a change in distance between the vehicle 51 and the travel lane characteristic points FP derived from the lane change.

The distance between the vehicle and the travel lane characteristic points is changed by the amount of movement (OF) of the vehicle in the vehicle width direction because of the lane change. Thus, the distance between the vehicle and the travel lane characteristic points is corrected by the amount of movement (OF) of the vehicle in the vehicle width direction. Accordingly, the change of the detected distance derived from the lane change can be offset, so that the travel lane characteristic points are continuously distributed regardless of the presence or absence of the lane change, which facilitates the estimation of the travel lane boundaries.

The travel lane boundary estimation circuit 24 sets the period between the start and the completion of the lane change based on the time when the lane change of the vehicle 51 is detected. According to the second embodiment, the time (Ts) when the lane change starts and the time (Tc) when the lane change is completed are each set in accordance with the time when the lane change of the vehicle 51 is detected. Accordingly, the travel lane characteristic points FP detected before the lane change starts and the travel lane characteristic points FP detected after the lane change is completed can be specified accurately.

The functions described in the respective embodiments may be implemented in one or more processing circuits. A processing circuit includes a programmed processing device such as a processing device including an electric circuit. Such a processing device includes an application specific integrated circuit (ASIC) configured to execute the functions described in the respective embodiments or a conventional circuit component.

While the respective embodiments are illustrated with the stand-alone travel lane detection device 1 including the movement amount detection sensor 10 and the target detection sensor 11, the travel lane detection device may be of a client-server model using a computer network via a wireless communication network. In such a case, the vehicle 51 (the client), including the movement amount detection sensor 10 and the target detection sensor 11, is connected to the travel lane detection device (the server) via a computer network, for example. The server including the travel lane detection circuit 12 as shown in FIG. 1 thus can be connected to the movement amount detection sensor 10 and the target detection sensor 11 via a computer network. The travel lane detection device in this case includes mainly the travel lane detection circuit 12 (the server) without including the movement amount detection sensor 10 or the target detection sensor 11.

While the present invention has been described above with reference to the embodiments, it should be understood that the present invention is not intended to be limited to the embodiments described above, and various modifications and improvements will be apparent to those skilled in the art within the scope of the present invention.

REFERENCE SIGNS LIST

1 TRAVEL LANE DETECTION DEVICE
10 MOVEMENT AMOUNT DETECTION SENSOR
11 TARGET DETECTION SENSOR
12 TRAVEL LANE DETECTION CIRCUIT
24 TRAVEL LANE BOUNDARY ESTIMATION CIRCUIT
25 LANE CHANGE DETECTION CIRCUIT
51 VEHICLE
FP, FP' TRAVEL LANE CHARACTERISTIC POINT
OF LANE CHANGE AMOUNT (OFFSET AMOUNT)

The invention claimed is:

1. A travel lane detection method using a travel lane detection circuit for accumulating, according to an amount of movement of a vehicle, a plurality of travel lane characteristic points detected by a target detection sensor installed in the vehicle so as to detect travel lane boundaries according to the accumulated travel lane characteristic points, the travel lane detection circuit being configured to, when a lane change of the vehicle is detected, correct the travel lane characteristic points detected and accumulated before the lane change starts according to an amount of movement of the vehicle in a vehicle width direction derived from the lane change, and detect the travel lane boundaries after the lane change of the vehicle is completed by use of the corrected travel lane characteristic points detected and accumulated before the lane change starts and the travel lane characteristic points detected and accumulated after the lane change is completed.

2. The travel lane detection method according to claim 1, wherein the travel lane detection circuit groups the accumulated travel lane characteristic points according to a position of the vehicle in the vehicle width direction, detects the travel lane boundaries based on the travel lane characteristic points grouped and extracted, groups, among the accumulated travel lane characteristic points, the corrected travel lane characteristic points detected and accumulated before the lane change starts and the travel lane characteristic points detected and accumulated after the lane change is completed when the lane change is detected, and detects the travel lane boundaries after the lane change of the vehicle is completed according to the travel lane characteristic points grouped and extracted.

3. The travel lane detection method according to claim 1, wherein the travel lane detection circuit moves positions of the travel lane characteristic points in the vehicle width direction detected before the lane change starts in a direction opposite to a lane change direction by an amount which is the same as the amount of movement of the vehicle in the vehicle width direction derived from the lane change so as to use the moved travel lane characteristic points.

4. The travel lane detection method according to claim 1, wherein the travel lane detection circuit does not use the travel lane characteristic points detected during a period from which the lane change starts to which the lane change is completed.

5. The travel lane detection method according to claim 1, wherein the travel lane detection circuit sets a time at which the lane change starts and a time at which the lane change is completed according to a time when the lane change of the vehicle is detected.

6. A travel lane detection device comprising a controller programmed to:
accumulate, according to an amount of movement of a vehicle, a plurality of travel lane characteristic points detected by a target detection sensor installed in the vehicle; and
detect travel lane boundaries according to the accumulated travel lane characteristic points,
when a lane change of the vehicle is detected, correct the travel lane characteristic points detected and accumulated before the lane change starts according to an amount of movement of the vehicle in a vehicle width direction derived from the lane change, and detect the travel lane boundaries after the lane change of the vehicle is completed by use of the corrected travel lane characteristic points detected and accumulated before the lane change starts and the travel lane characteristic points detected and accumulated after the lane change is completed.

7. A travel lane detection method using a travel lane detection circuit for accumulating, according to an amount of movement of a vehicle, a plurality of travel lane characteristic points detected by a target detection sensor installed in the vehicle so as to detect travel lane boundaries according to the accumulated travel lane characteristic points,
the travel lane detection circuit being configured to, when a lane change of the vehicle is detected, ignore the travel lane characteristic points detected and accumulated before the lane change is completed, and detect the travel lane boundaries after the lane change of the vehicle is completed by use of the travel lane characteristic points detected and accumulated after the lane change is completed.

8. The travel lane detection method according to claim 7, wherein the travel lane detection circuit groups the accumulated travel lane characteristic points according to a position of the vehicle in a vehicle width direction, detects the travel lane boundaries based on the travel lane characteristic points grouped and extracted, groups, among the accumulated travel lane characteristic points, the travel lane characteristic points detected and accumulated after the lane change is completed when the lane change is detected, and detects the travel lane boundaries after the lane change of the vehicle is completed according to the travel lane characteristic points grouped and extracted.

* * * * *